(12) United States Patent
Iversen

(10) Patent No.: US 10,273,959 B2
(45) Date of Patent: Apr. 30, 2019

(54) PUMP ASSEMBLY

(71) Applicant: Grundfos Holding a/s, Bjerringbro (DK)

(72) Inventor: Kåre Iversen, Langa (DK)

(73) Assignee: Grundfos Holding a/s, Bjerringbro (DK)

( * ) Notice: Subject to any disclaimer, the term of this patent is extended or adjusted under 35 U.S.C. 154(b) by 121 days.

(21) Appl. No.: 14/368,974

(22) PCT Filed: Dec. 14, 2012

(86) PCT No.: PCT/EP2012/075626
§ 371 (c)(1),
(2) Date: Jun. 26, 2014

(87) PCT Pub. No.: WO2013/098099
PCT Pub. Date: Jul. 4, 2013

(65) Prior Publication Data
US 2014/0377104 A1      Dec. 25, 2014

(30) Foreign Application Priority Data
Dec. 27, 2011 (EP) ................... 11195806

(51) Int. Cl.
*F04D 13/06* (2006.01)
*F04D 29/62* (2006.01)
*F16C 27/02* (2006.01)

(52) U.S. Cl.
CPC ....... *F04D 13/0633* (2013.01); *F04D 29/628* (2013.01); *F16C 27/02* (2013.01)

(58) Field of Classification Search
CPC .... F04B 17/03; F04D 13/0633; F04D 29/628; H02K 5/128; H02K 5/1672; H02K 7/083
See application file for complete search history.

(56) References Cited

U.S. PATENT DOCUMENTS 3,413,925 A * 12/1968 Campolong ........ F04D 29/0416
                                                 310/52
3,960,418 A    6/1976 Bracken
4,289,592 A *  9/1981 Janner .................... B01D 59/34
                                                 204/157.21
(Continued)

FOREIGN PATENT DOCUMENTS

DE    7836469 U1    5/1979
DE    4108257 A1    9/1991
(Continued)

OTHER PUBLICATIONS

Int'l Search Report dated Jan. 23, 2013 in Int'l Application No. PCT/EP2012/075626.

*Primary Examiner* — Dominick L Plakkoottam
(74) *Attorney, Agent, or Firm* — Panitch Schwarze Belisario & Nadel LLP

(57) ABSTRACT

A pump assembly has an electric drive motor which is designed as a canned motor which has a bearing (22) in the interior of motor can (14), on which a motor shaft (20) is supported. The bearing (22) has an outer diameter that is smaller than an inside diameter of the motor can (14) and the bearing (22) in the interior of the motor can (14) is supported on a bearing holder (24) which has multiple steps (40) extending traversely to an inner circumference of the motor can (14).

20 Claims, 5 Drawing Sheets

(56) References Cited

U.S. PATENT DOCUMENTS

Figure 1:
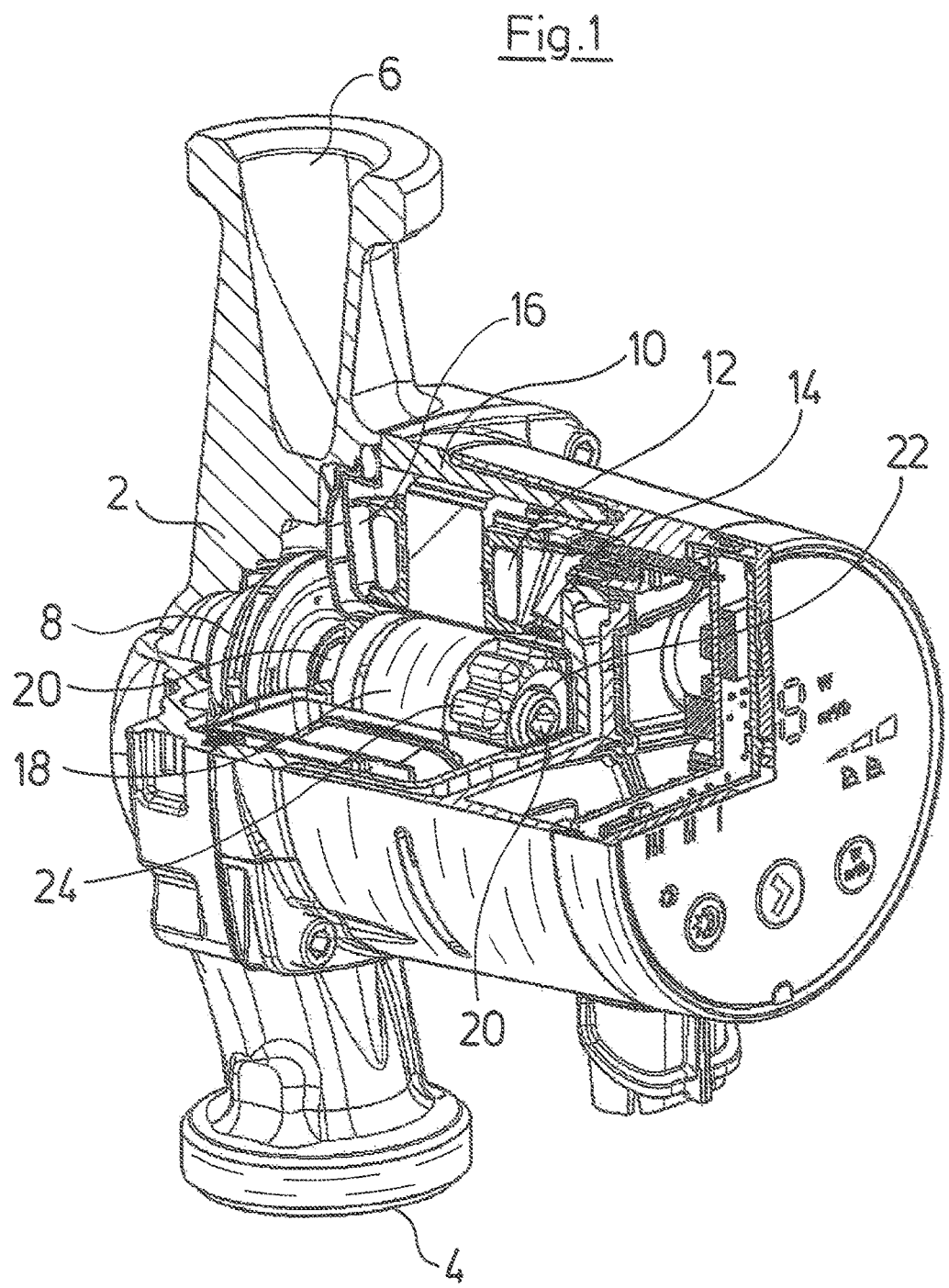

| | | | |
|---|---|---|---|
| 4,944,611 A | 7/1990 | Ankenbauer et al. | |
| 5,692,886 A * | 12/1997 | Kobayashi | F04D 13/0646 |
| | | | 415/111 |
| 6,415,512 B1 * | 7/2002 | Jeong | B21J 5/12 |
| | | | 148/906 |
| 8,083,500 B1 * | 12/2011 | Lebkuchner | F04B 17/03 |
| | | | 417/423.12 |
| 8,303,184 B1 * | 11/2012 | Lebkuchner | F16C 17/028 |
| | | | 310/90 |
| 2001/0024613 A1 * | 9/2001 | Eisert | H02K 5/128 |
| | | | 415/200 |

FOREIGN PATENT DOCUMENTS

| | | | | |
|---|---|---|---|---|
| DE | 102006053479 A1 | | 5/2008 | |
| GB | 866678 A | * | 4/1961 | F16C 27/04 |

* cited by examiner

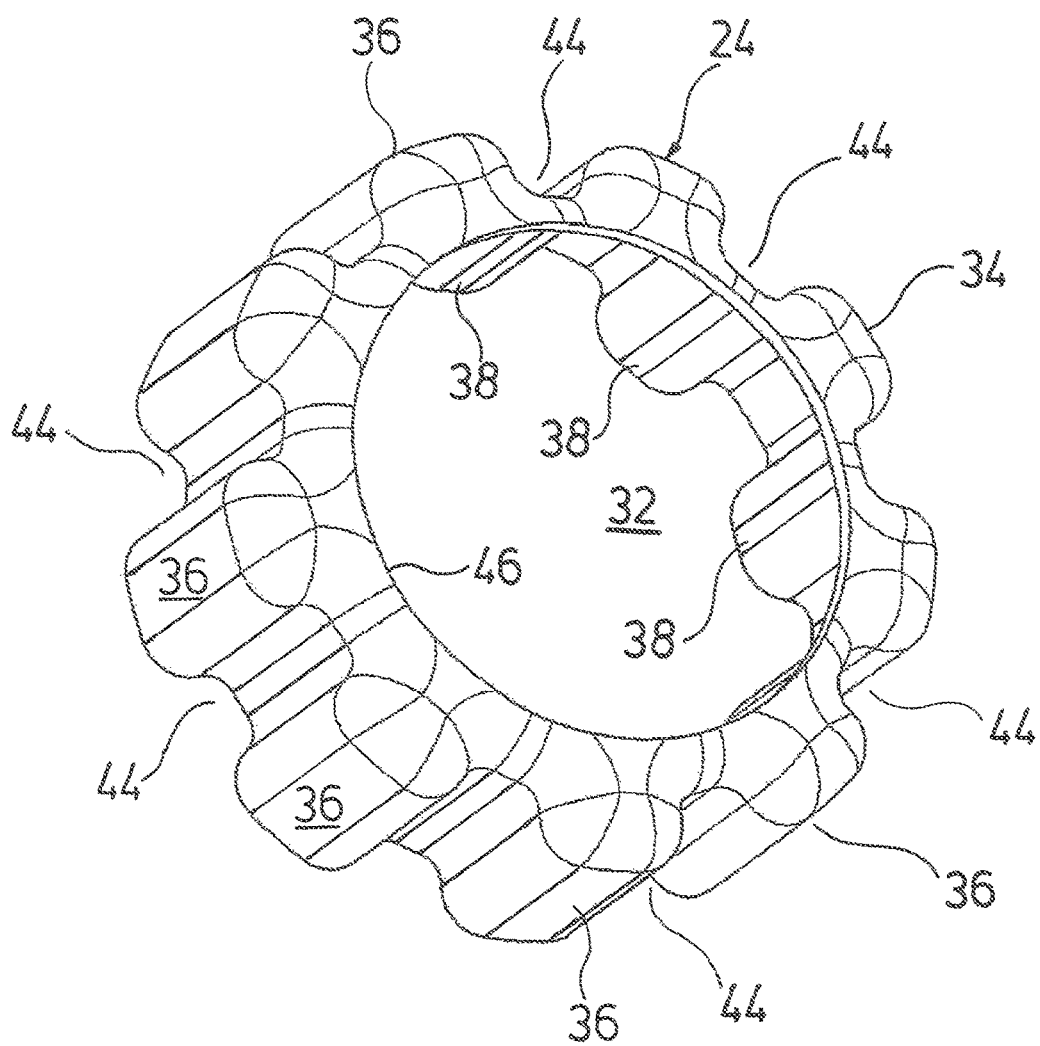

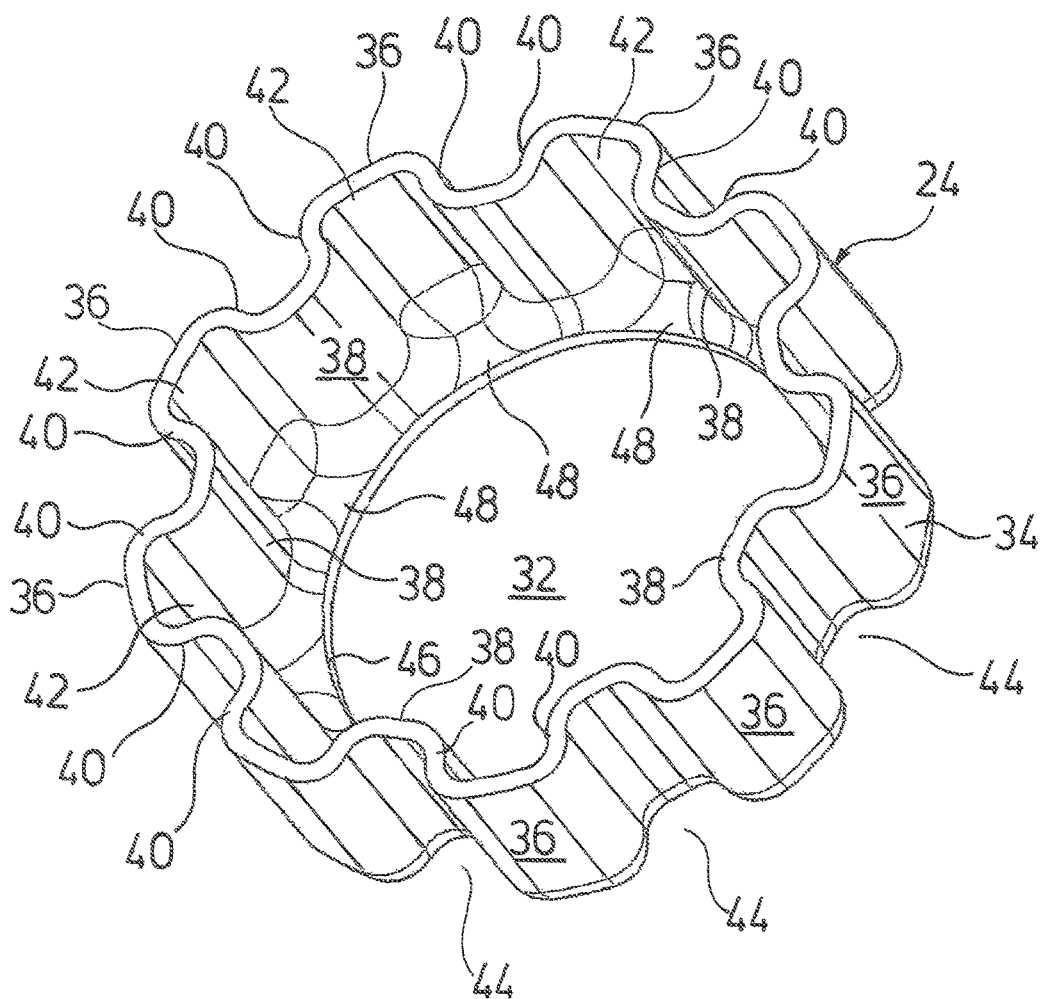

PUMP ASSEMBLY

CROSS-REFERENCE TO RELATED APPLICATIONS

This application is a Section 371 of International Application No. PCT/EP2012/075626, filed Dec. 14, 2012, which was published in the German language on Jul. 4, 2013, under International Publication No. WO 2013/098099 A1 and the disclosure of which is incorporated herein by reference.

BACKGROUND OF THE INVENTION

The invention relates to a pump assembly having an electric drive motor designed as a canned motor, the canned motor comprising: a can pot, a bearing inside the can pot, and a motor shaft mounted in the bearing.

With pump assemblies having an electric motor designed as a canned motor, such as circulation pump assemblies for heating installations, for example, a bearing is usually arranged in the inside of a can pot, in which bearing an axial end of a motor shaft is mounted in the radial direction. For fastening this bearing, it is known to weld a bearing holder onto the axial end of the can, in which bearing holder the bearing is accommodated. This bearing holder then, as a rule, has a smaller inner diameter than the adjacent can. This construction of the can with the welded on bearing holder requires relatively much effort.

For this reason, it is the object of the invention to improve a pump assembly with a canned motor, to the extent that the bearing may be arranged in a simple manner on a can pot.

BRIEF SUMMARY OF THE INVENTION

This object is achieved by a pump assembly of the type described at the outset. The bearing has an outer diameter that is smaller than the inner diameter of the can pot. The bearing is mounted in the inside of the can pot in a bearing holder. The bearing holder comprises several webs extending transversely to the inner periphery of the can pot. Preferred embodiments are to be deduced from the subsequent description as well as the attached figures.

The pump assembly according to embodiments of the invention comprises an electric motor, which in the known manner is designed as a canned motor, and, with the actual pump, forms a construction unit. The can is designed as a can pot which is to say that an axial end of the can, specifically the axial end of the can which is away from the impeller of the pump, is designed in a closed manner. Such a can pot may be manufactured in the known manner from metal, in particular from rust-free steel. Thereby, the can pot may, in particular, be manufactured as a deep-drawn part. A bearing for mounting a motor shaft is arranged in the inside of the can pot. Thereby, the bearing is arranged close to the closed end of the can pot. The bearing has an outer diameter which is smaller than the inner diameter of the can pot. This means that the can pot in the region, in which the bearing is arranged is preferably not designed in a tapered manner.

In order to be able to fix and mount the bearing in the can pot despite the fact that the bearing has a smaller outer diameter than the inner diameter of the can pot, a bearing holder is provided which fills the free space between the outer diameter of the bearing and the inner diameter of the can pot and fixes the bearing in the can pot in a centered manner. For this, the bearing holder comprises several webs extending transversely to the inner periphery of the can. This means that the bearing holder is not designed as a solid material. The webs are preferably spaced from one another in the peripheral direction and are distributed over the periphery. Particularly preferably, the webs thereby are distributed uniformly over the periphery, in order to be able to uniformly transmit radial forces in all directions, from the bearing onto the can pot. The bearing holder is preferably manufactured as a separate component which, after manufacture of the can pot, is inserted into this. The bearing before the insertion of the bearing holder into the can pot may be arranged in the bearing holder or however also after the insertion of the bearing holder into the can pot. The bearing is ground on its inner periphery, further preferably after the insertion into the can pot, in order to ensure a centering of the bearing surfaces with respect to the inner diameter of the can pot.

The webs extend transversely to the inner periphery of the can, which is to say preferably essentially radially to the longitudinal axis of the can pot, which is to say to the rotation axis of the motor shaft. The webs and preferably the complete bearing holder may for example be designed of plastic or also of metal.

Particularly preferably, the webs are formed from a flat material, in particular of sheet metal which has a wall thickness which is smaller than the radial distance between the outer periphery of the bearing and the inner periphery of the can. That means that this flat material extends with its surfaces, transversely, in particular radially to the inner periphery of the can pot or to the longitudinal axis of the can pot.

Preferably, several webs may be formed as one piece from a formed flat material which runs in a wave-like and/or zigzag manner in the peripheral direction. This means that this flat material always changes its extension direction such that webs are formed which extend transversely or, in particular, essentially radially to the inner periphery of the can pot. Thereby, the webs which are thus formed may, in sections, also extend at an angle, and, in particular, at an acute angle to the radius. The wave-like or zigzag-like shape may, in particular, be manufactured by way of forming the flat material or sheet metal. The course which in cross section is zigzagged or wavelike thereby preferably extends over the whole outer periphery of the bearing holder and fills the free space between the inner periphery of the can pot and the outer periphery of the bearing. Thereby, the apex points, or apex regions of the wave-like or zigzag-like flat material come into bearing contact on the inner periphery of the can pot as well as on the outer periphery of the bearing, thus ensuring the radial fixation of the bearing in the inside of the can pot and a force transmission from the bearing onto the can pot in the radial direction.

Preferably, the flat material thus extends over the whole periphery, in particular, as a closed ring. In this manner, the bearing is fixed or mounted over the whole periphery radially in the inside of the can pot.

The bearing holder is preferably dimensioned relative to the bearing such that the bearing is fixed in the inside of the bearing holder with a non-positive fit. This means that the bearing holder has an inner diameter which is preferably slightly smaller than the outer diameter of the bearing, so that a deformation of the bearing holder occurs on inserting the bearing, and this deformation, due to elastic restoring forces, leads to a non-positive bearing contact of the bearing holder on the outer periphery of the bearing.

Moreover, the bearing holder is preferably dimensioned relative to the inner periphery of the can pot such that the bearing holder is fixed in the inside of the can pot with a non-positive fit. For this, the bearing holder, if it is not inserted into the can pot, preferably has an outer diameter which is slightly larger than the inner diameter of the can pot, so that the bearing holder is elastically deformed on insertion into the can pot and thus is fixed with a non-positive fit on the inner wall of the can pot. The elastic deformability of the bearing holder for the non-positive fixation of the bearing and/or for the non-positive fixation of the bearing holder in the inside of the can pot may be effected by way of a deformation of the individual webs extending transversely to the inner periphery of the can, or by way of deformation of the webs to one another.

The bearing holder is particularly preferably formed from sheet metal. Thereby, the shaping may be effected in particular by way of deep-drawing. Thus the bearing holder may, for example, be manufactured from a round sheet metal part, in which firstly a beaker-like shape is produced by way of deep-drawing. Subsequently, a wave-like structure may be formed in the peripheral wall and, as the case may be, in the end-face of this beaker-like shape, by way of the peripheral wall in the radial direction being pressed in inwards and/or outwards at several locations. In the last step, the base or a central region of the base may finally be punched out of this beaker-like structure provided with indents or waves. In this manner, such a bearing holder of sheet-metal may be manufactured completely from forming and punching, without material-removing machining or thermal machining processing being necessary. Moreover, the bearing holder may be thus designed as one piece. Thus a closed ring structure may be produced without welding or joining procedures.

Particularly preferably, the bearing holder comprises at least one radially inwardly directed axial abutment, on which the bearing with one axial end comes into bearing contact. This abutment is preferably designed on the side of the bearing holder which faces the base of the can pot and for its part preferably bears on the base of the can pot. This abutment fixes the bearing in the axial direction and prevents the bearing from being able to slip out of the bearing holder in the axial direction or being inserted too far into the bearing holder in the axial direction.

The radially inwardly directed abutment is further preferably formed by a radially inwardly extending peripheral collar. Such a collar may be easily formed by way of deep drawing with the previously described manufacturing method, by way of the base of the beaker-like structure not being completely removed, but only a central region being removed, so that an annular section of the base as a peripheral collar remains on the inner periphery of the bearing holder.

According to a particularly preferred embodiment, the bearing holder comprises at least one channel which in the axial direction extends completely through the bearing holder. This channel permits the fluid, for example water, to be delivered to flow through the bearing holder and to thus reach the rear side of the bearing, so that the bearing is completely peripherally flushed. This is advantageous since the lubrication of the bearing is usually effected by the fluid to be delivered. Such a channel or several channels may be formed by webs of the bearing holder which are spaced from one another. Thereby, the free spaces between the webs form such channels. For this, the free spaces extend from one axial end to the opposite axial end of the bearing holder. With a wave-like or zigzag structure of the bearing holder, the channels are formed by the indentations which are formed in the radial direction, which means by the free cross-sectional areas spanned by the wave-like or zigzag-shaped structure.

Further preferably, at least one radially extending channel is formed in the abutment and, at its radial outer end, is preferably connected to a channel extending in the axial direction through the bearing holder. This channel permits fluid, which flows through the bearing holder or peripherally past the bearing holder, to be able to flow radially inwards on the rear side of the bearing holder, towards the bearing or the bearing surfaces of the bearing, in order to ensure an adequate lubrication there. The channel in the abutment or the channels in the abutment preferably lie on the side which faces the bearing, but additionally or alternatively may also be situated on the side which faces the base of the can pot. The radially extending channels preferably extend as extensions of the axially extending channels. On forming a sheet metal part which is firstly deep drawn in a beaker-like manner, such channels may be created by way of indents or bulges of the sheet metal which are distributed over the periphery, preferably uniformly distributed over the periphery, in the sheet metal. Thereby, the sheet-metal base of the beaker-like structure is provided with indentations and bulges in a corresponding manner. If the central region of the sheet-metal base is punched out, then a wave-like or zigzag structure remains in the peripheral collar, and this structure defines the radially extending channels on the surfaces.

The bearing holder is usefully designed and arranged in the can pot in a manner such that the bearing is positioned in an axially distanced manner, to a base of the can pot. Thereby, preferably the bearing holder, with its axial face-end, preferably with the outer side of its radially inwardly extending abutment or collar, bears on the base of the can pot. Thus the bearing holder holds the bearing at a defined distance to the base of the can pot. If the radially inwardly directed collar or abutment of the bearing holder is formed in the previously described manner with radially inwardly extending channels, for example by way of a wave-like structure of the collar, then it is ensured that fluid may flow between the bearing and the base of the can and thus may flow around the bearing at the rear side, in order to ensure the adequate lubrication on the bearing surfaces.

The can pot may have a reduced wall thickness in an axial region, in which a rotor is arranged, which is to say in the axial region, in which the magnetically effective components of the rotor are arranged. By way of this, the magnetic efficiency between the stator and rotor may be improved. The bearing holder however is preferably arranged in an axial region with a non-reduced wall thickness. Thus an adequate stability of the can pot may be created in the region of the bearing, for accommodating the forces transmitted by the bearing. A thinning of the wall of the can pot may be effected by way of pressing or rolling for example. Thereby, the axial end of the can pot which faces the base of the can pot is not machined, so that this region, in which the bearing holder with the bearing is then arranged, is not thinned out. The can pot, however, over its complete axial length preferably has essentially the same diameter, with the exception of such a reduced wall thickness by thinning out the wall thickness.

The pump assembly according to the invention is particularly preferably designed as a circulation pump assembly and, in particular, as a heating circulation pump assembly.

BRIEF DESCRIPTION OF THE SEVERAL
VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Figure 2:
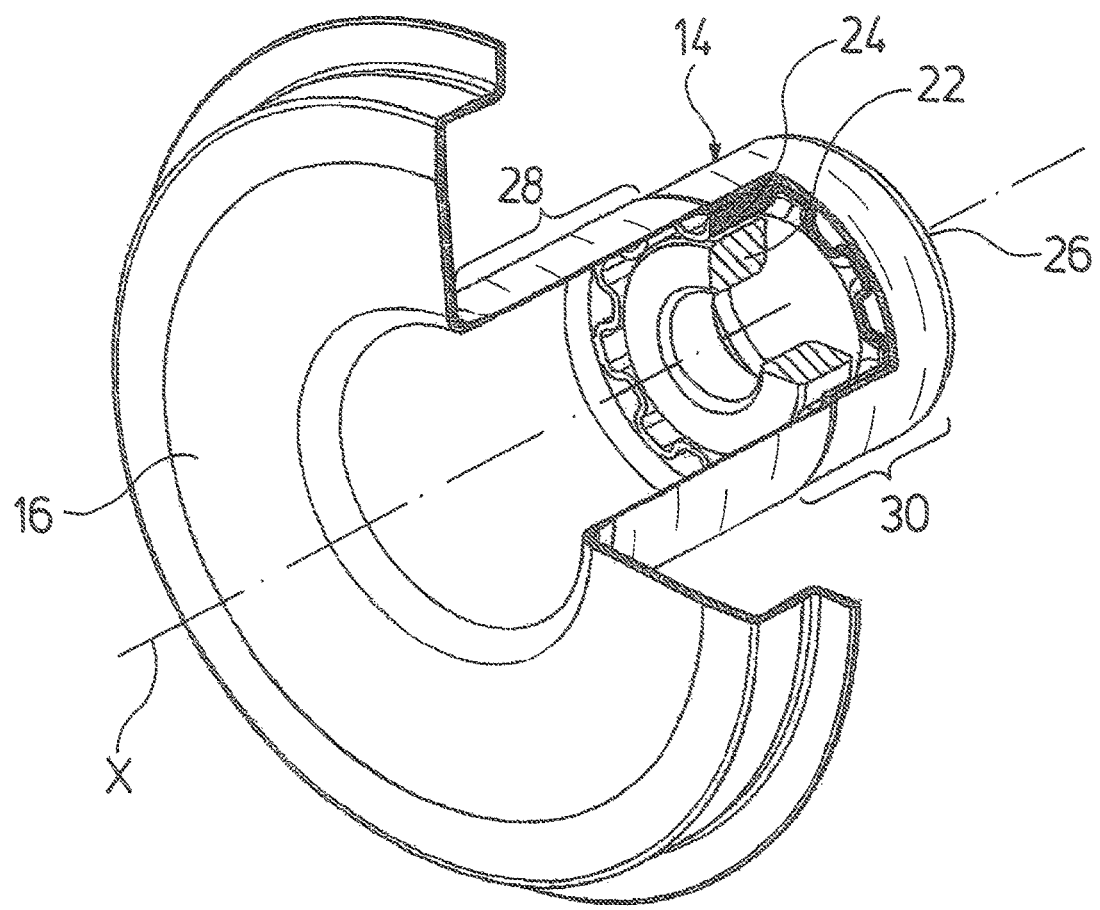
Figure 3:
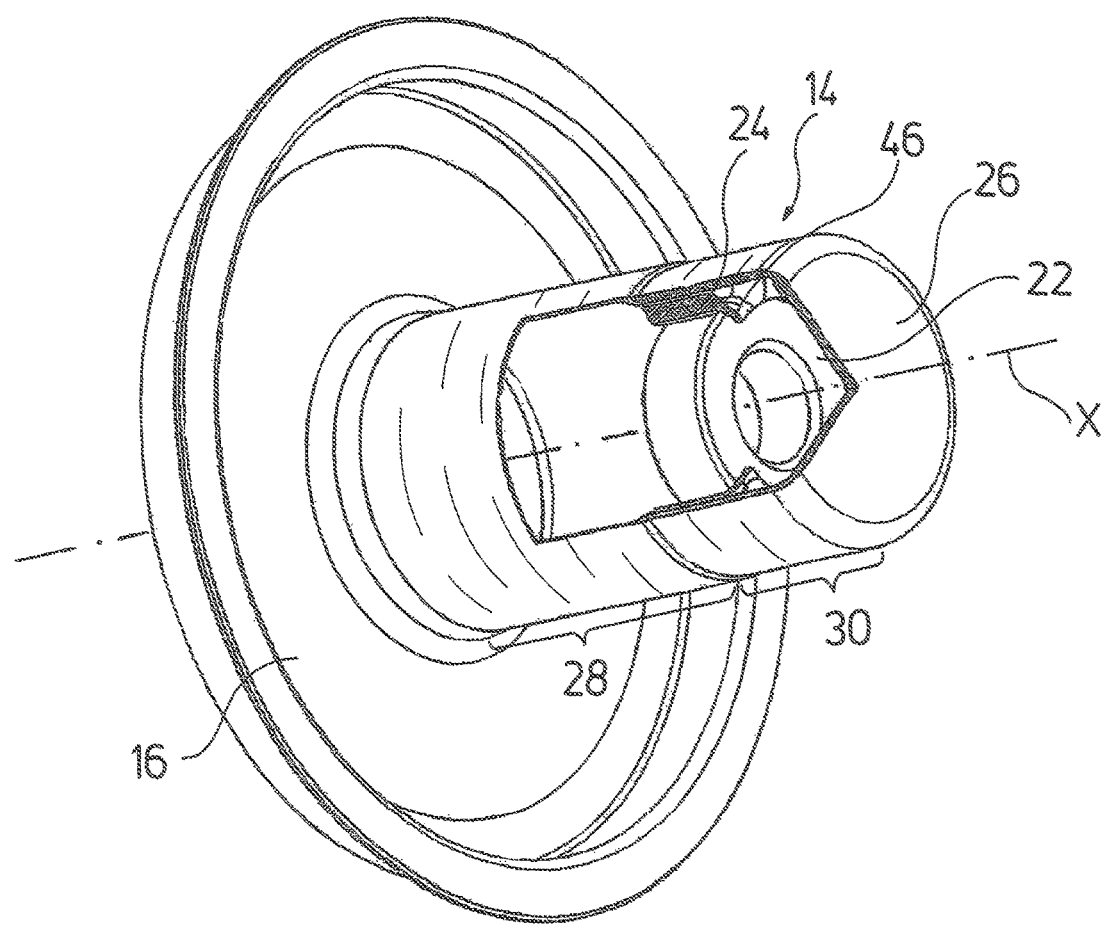

The invention is hereinafter described by way of example and by way of the attached figures. In these are shown in:

FIG. 1 is a partly sectioned overall view of a pump assembly according to an embodiment of the invention, FIG. 2 is a partly sectioned overall view of the can pot of the pump assembly according to FIG. 1, from the side facing the impeller, according to an embodiment of the invention, FIG. 3 is a partly sectioned overall view of the can pot according to FIG. 2, seen from the rear side, according to an embodiment of the invention, FIG. 4 is a perspective view of the bearing holder seen from the rear side, according to an embodiment of the invention, and FIG. 5 is a perspective view of the bearing holder according to FIG. 4, seen from the front side, according to an embodiment of the invention.

DETAILED DESCRIPTION OF THE INVENTION

The pump assembly according to FIG. 1 is a heating circulation pump assembly which in the known manner comprises a pump housing 2 with a suction connection 4 and a pressure connection 6. An impeller 8 is arranged in the pump housing 2. A stator housing 10 with a stator 12 of an electrical drive motor which is arranged thereon, is applied onto the pump housing 2. The electric drive motor is designed as a canned motor. This means that a can pot 14 is arranged in the inside of the stator 12, said can pot via a radially outward projecting collar 16 sealing the region of the stator housing 10, in which the stator 12 is arranged, to the interior of the pump housing 2, in which the fluid to be delivered is located. A rotor 18 is arranged in the inside of the can pot 14 and rotatingly drives the impeller 8 via the motor shaft 20. The motor shaft 20 at its axial end, which is away from the impeller 8, is mounted in a radial bearing 22. The radial bearing 22 for its part is fixed in a bearing holder 24 in the inside of the can pot 14.

The design and function of the bearing holder 24 is described in more detail by way of FIGS. 2 to 5. The can pot 14 at its open end comprises the radially outward directed collar 16. At its opposite axial end, the can pot 14 is closed by a base 26.

The wall of the can pot 14 in the axial region 28 of this can pot which connects to the collar 16, is designed in a thinned manner or with a reduced thickness, in order to improve the magnetic flux between the stator 12 and the rotor 18 in this region. The wall thickness of the can pot 14 is not reduced in the axial region 30 of the can pot 14 which is adjacent the base 26. The bearing holder 24 with the radial bearing 22 arranged therein is arranged in this region. The radial bearing 22 is preferably designed as a plain bearing, for example of ceramic.

The bearing holder 24 is designed as a deep drawn part of sheet metal. The bearing holder 24 has a pot-like basic shape, wherein the central region 32 of the base of this pot-like structure is preferably removed by way of punching, so that an open central region 32 is formed. The peripheral wall 34 has a wave-like structure, wherein the radially outer lying apex regions 36 come into a non-positive bearing contact on the inner periphery of the can pot 14, whilst the radially inward lying apex regions 38 of the wave-like structure of the peripheral wall 34 come into a non-positive bearing contact on the outer periphery of the radial bearing 22. Thus, the peripheral wall 34 running in a wave-like manner fills the free space between the radial bearing 22 and the inner periphery of the can pot 14, and fixes and centers the radial bearing 22 in the inside of the can pot 14. For centering the inner peripheral surface of the radial bearing 22 which forms the bearing surface, with respect to the longitudinal axis or rotation axis X, the radial bearing 22 is preferably ground after insertion into the can pot 14.

The wave-like structure of the peripheral wall 34 is achieved by way of the radially outer lying apex regions 36 and the radially inner lying apex regions 38 alternating in a manner which is regularly distributed over the periphery. Such a structure may be achieved, for example, by way of forming a previously cylindrical pot. Webs 40 which are directed transversely to the inner periphery of the can pot, which is to say essentially radially to the rotation axis X, are created by way of this wave-like structure, and these webs connect the apex regions 36 and 38 to one another. The webs 40 serve for centering the bearing 22 in the can pot 14, and for transmitting the radial forces from the radial bearing 22 onto the peripheral wall of the can pot 14.

By way of the wave-like structure, free spaces 42 are formed on the inner peripheral of the peripheral wall 34 of the bearing holder 24, between the webs 40. These free spaces 42 thus lie radially within the apex regions 36. Accordingly, free spaces lying therebetween are formed radially outside the inner apex regions 38 on the outer side of the peripheral wall 34. These free spaces 42 and the free spaces 44 on the outer periphery form channels extending axially over the complete length of the bearing holder 24, through which channels of fluid may flow in the inside of the can pot 14 from the side facing the pump housing 2 through the bearing holder 24 to the rear side of the radial bearing 22.

Departing from the peripheral wall 34, the bearing holder 24 at an axial end moreover comprises a radially inwardly directed collar 46. This radially inward directed collar 46 is designed as an annular collar. The annular collar 46 represents the outer region of the base of the pot-like structure of the bearing holder 24 which remains after punching out the central region 32. The collar 46 serves as an axial abutment for the radial bearing 22 when this is inserted or pressed in from the open axial side, thus the side which is away from the collar 46, into the bearing holder 24. Moreover, the collar 46 with its outer side may come into bearing contact on the base 26 in the inside of the can pot 14. Thus the collar 46 then holds the radial bearing 22 at a distance to the base 46. The free spaces 42 acting as channels, on the inner periphery of the peripheral wall 34 of the bearing holder 24 run out at the inner side of the collar 46, into radially inward extending channels 48. In this manner, fluid which flows through the free spaces 42 in the axial direction is directed in a radially inward manner via the channel 48 on the collar 46, so that the radial bearing 22 is subjected to flow at the rear side.

As a whole, one may recognize that a very simple fixation of the radial bearing 22 in the inside of the can pot 14 and simultaneously the flow of fluid around the radial bearing 22 is ensured by way of the bearing holder 24 designed as a deep-drawn part of sheet metal. The bearing holder 24 is dimensioned such that its outer diameter in the region of the outer apex regions 36 is slightly larger than the inner diameter of the can pot 14. Thus the bearing holder 24 may be pressed into the inside of the can pot 14 and may be held with a non-positive fit in the axial region 30. Simultaneously, the inner diameter in the region of the inner apex regions 38 of the bearing holder 24 is preferably slightly smaller than the outer diameter of the radial bearing 22, so that the radial bearing 22 may be pressed into the inside of the bearing holder 24 and fixed there with a non-positive fit.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A pump assembly having an electric drive motor designed as a canned motor, the canned motor comprising:
    a can pot;
    a bearing inside the can pot; and
    a motor shaft mounted in the bearing,
    wherein the bearing has an outer diameter which is smaller than an inner diameter of the can pot, and the bearing is mounted inside the can pot in a bearing holder which comprises a plurality of webs extending transversely to an inner periphery of the can pot and free spaces between the webs of the bearing holder forming a plurality of channels extending in an axial direction entirely through the bearing holder, the channels each providing a path for fluid flow along the entire axial length of the bearing holder along the outer periphery of the bearing and the inner periphery of the can pot, and wherein the bearing holder forms a ring having the plurality of channels along the outer periphery of the bearing and the inner periphery of the can pot, the ring extending around the entire periphery of the bearing without any gaps, seams, or welds therein, and wherein the bearing holder is formed from sheet metal.

2. The pump assembly according to claim 1, wherein the sheet metal of the bearing holder has been formed by deep drawing.

3. The pump assembly according to claim 2, wherein the sheet metal comprises a rust-free steel.

4. The pump assembly according to claim 1, wherein the webs each have a wall thickness smaller than a radial distance between an outer periphery of the bearing and the inner periphery of the can pot.

5. The pump assembly according to claim 1, wherein the plurality of webs extend in a peripheral direction in at least one of a wave-shaped and a zigzag manner.

6. The pump assembly according to claim 5, wherein the bearing holder extends across an entire inner diameter of the can pot.

7. The pump assembly according to claim 1, wherein the bearing holder is dimensioned relative to the bearing such that the bearing holder has an inner diameter at a plurality of inwardly lying apex regions at least slightly smaller than the outer diameter of the bearing when the bearing has not been inserted into the bearing holder, so that when the bearing is inserted into the bearing holder, an elastic deformation of the bearing holder occurs, and due to elastic restoring forces resulting from the elastic deformation, the bearing holder exerts a force on the outer periphery of the bearing, thereby fixing the bearing inside the bearing holder.

8. The pump assembly according to claim 1, wherein the bearing holder is dimensioned relative to the inner diameter of the can pot such the can pot has an inner diameter at least slightly smaller than the outer diameter at a plurality of outwardly lying apex regions of the bearing holder when the bearing holder has not been inserted into the can pot, so that when the bearing holder is inserted into the can pot, an elastic deformation of the bearing holder occurs, and due to elastic restoring forces resulting from the elastic deformation, the bearing holder exerts a force on the inner periphery of the can pot, thereby fixing the bearing holder inside the can pot.

9. The pump assembly according to claim 1, wherein the bearing holder comprises at least one radially inwardly directed axial abutment, on which the bearing comes into bearing contact with an axial end of the axial abutment.

10. The pump assembly according to claim 9, wherein the at least one radially inwardly directed axial abutment is formed by a radially inwardly extending peripheral collar.

11. The pump assembly according to claim 9, wherein at least one radially extending channel is formed in the at least one radially inwardly directed axial abutment, a radially outer end of said at least one radially extending channel being connected to a channel extending in an axial direction through the bearing holder.

12. The pump assembly according to claim 1, wherein the bearing holder is designed and arranged in the can pot, such that the bearing is positioned axially spaced from a base of the can pot.

13. The pump assembly according to claim 1, wherein the can pot has a constant inner diameter in an axial region where the bearing holder and the bearing are located.

14. The pump assembly according to claim 1, wherein a rotor is arranged in a first axial region of the can pot, and wherein the first axial region has a reduced wall thickness and the bearing holder is arranged in a second axial region with a wall thickness which is not reduced.

15. The pump assembly according to claim 1, wherein the pump assembly is designed as a circulation pump assembly.

16. The pump assembly according to claim 4, wherein the wall thickness of each web is essentially constant and essentially equal to that of the sheet metal from which the bearing holder is formed.

17. The pump assembly according to claim 7, wherein the wall thickness of each web is essentially constant and essentially equal to that of the sheet metal from which the bearing holder is formed.

18. The pump assembly according to claim 8, wherein the wall thickness of each web is essentially constant and essentially equal to that of the sheet metal from which the bearing holder is formed.

19. The pump assembly according to claim 1, wherein the bearing holder is formed by the following steps:
    providing a piece of sheet metal;
    forming the sheet metal into a round sheet;
    forming the round sheet into a beaker shape by deep drawing, the beaker shape having an end-face;
    forming one of a wavelike shape and a zigzag shape in a peripheral wall of the beaker shape; and
    punching out the end-face of the beaker shape.

20. The pump assembly according to claim 19, wherein the shape formed in the peripheral wall of the bearing holder comprises the plurality of webs for extending transversely from the outer periphery of the bearing to the inner periphery of the can pot and the free spaces between the webs for forming the plurality of channels extending in the axial direction entirely through the bearing holder, the channels each providing a path for fluid flow along the entire axial length of the bearing holder along the inner periphery of the bearing holder and along the outer periphery of the can pot, and wherein the bearing holder forms the ring, which is circumferentially continuous, gap-free, seamless, and weld-free ring and has the plurality of channels along the outer periphery of the bearing and the inner periphery of the can pot.

* * * * *